US012711859B2

(12) United States Patent
Wahlstrom et al.

(10) Patent No.: US 12,711,859 B2
(45) Date of Patent: Aug. 18, 2026

(54) DETECTING, MONITORING AND MITIGATING TRAFFIC CONTROL DEVICE ANOMALIES

(71) Applicant: GM GLOBAL TECHNOLOGY OPERATIONS LLC, Detroit, MI (US)

(72) Inventors: Michael Wahlstrom, Wolverine Lake, MI (US); Fan Bai, Ann Arbor, MI (US); Shuqing Zeng, Sterling Heights, MI (US); Donald K. Grimm, Utica, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 19/010,472

(22) Filed: Jan. 6, 2025

(65) Prior Publication Data

US 2026/0196131 A1 Jul. 9, 2026

(51) Int. Cl.

| | |
|---|---|
| ***G08G 1/09*** | (2006.01) |
| ***G06Q 50/26*** | (2012.01) |
| ***G08G 1/01*** | (2006.01) |
| ***H04W 4/44*** | (2018.01) |

(52) U.S. Cl.

CPC ............ *G08G 1/091* (2013.01); *G06Q 50/26* (2013.01); *G08G 1/01* (2013.01); *H04W 4/44* (2018.02)

(58) Field of Classification Search

CPC .......... G08G 1/091; G08G 1/01; G08G 1/097; G06Q 50/26; H04W 4/44

See application file for complete search history.

(56) References Cited

U.S. PATENT DOCUMENTS

| | | | | |
|---|---|---|---|---|
| 2017/0084175 | A1* | 3/2017 | Sedlik | B60W 40/04 |
| 2018/0122227 | A1* | 5/2018 | Mubarek | G08G 1/0133 |
| 2018/0253968 | A1* | 9/2018 | Yalla | G08G 1/097 |
| 2019/0389471 | A1* | 12/2019 | Leekin | B60W 40/04 |
| 2020/0250989 | A1* | 8/2020 | Amacker | G08G 1/0112 |
| 2020/0273335 | A1* | 8/2020 | Murakami | G05D 1/0027 |
| 2020/0336541 | A1* | 10/2020 | Naderi Alizadeh | G05D 1/0088 |
| 2021/0312798 | A1* | 10/2021 | Huang | G01C 21/3837 |
| 2022/0073106 | A1* | 3/2022 | Ahn | G08G 1/097 |
| 2025/0330902 | A1* | 10/2025 | Lee | H04W 48/20 |

* cited by examiner

*Primary Examiner* — Ryan W Sherwin

(57) ABSTRACT

A cloud-based network device includes: a reporting module configured to receive first perception information regarding a target traffic control device from a scouter vehicle indicating an anomaly associated with the target traffic control device; at least one recruitment module configured to recruit worker vehicles by signaling the worker vehicles to drive through a target region where target traffic control device is located and collect second perception information regarding the target traffic control device; at least one consensus module configured to establish a consensus regarding the target traffic control device based on the first perception information and the second perception information; and at least one traffic control device avoidance module configured to signal at least one of i) other traffic control devices, and ii) onlooker vehicles, to prevent the onlooker vehicles from driving through the target region.

20 Claims, 10 Drawing Sheets

100
102
102
102
102
104
104
104
104
104
104

200

202
204
205
206
207
208
209
210
211
212
213
214
216
218
220
222
224
226
228
230
232
250

DETECTING, MONITORING AND MITIGATING TRAFFIC CONTROL DEVICE ANOMALIES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to traffic control devices (TCDs), and more particularly, to systems for monitoring and mitigating TCD anomalies.

Vehicles can have assisted and automated driving systems (sometimes referred to as autonomous driving systems), which are implemented to aid a driver or vehicle occupant in driving a vehicle. As an example, a vehicle can have a hands-free driving system that controls steering, braking, and accelerating operations during at least a portion of a trip. During hands-free driving, a driver is not controlling driving operations but may intervene should the driver disagree with an action being performed by the vehicle. This may occur, for example, by the driver tapping on a brake pedal or gas pedal and taking over control of vehicle steering, braking, and accelerating operations. Driving behaviors of the vehicles can be based on states of TCDs.

SUMMARY

A cloud-based network device is disclosed and includes: a reporting module configured to receive first perception information regarding a target traffic control device from a scouter vehicle indicating an anomaly associated with the target traffic control device; at least one recruitment module configured to recruit worker vehicles by signaling the worker vehicles to drive through a target region where target traffic control device is located and collect second perception information regarding the target traffic control device; at least one consensus module configured to establish a consensus regarding the target traffic control device based on the first perception information and the second perception information; and at least one traffic control device avoidance module configured to signal at least one of i) other traffic control devices, and ii) onlooker vehicles, to prevent the onlooker vehicles from driving through the target region.

In other features, the cloud-based network device further includes a control module of the cloud-based network device includes a neural network configured to classify intersection traffic flow pattern of the target region as a stop-and-go pattern, a traffic-light protected pattern, or as undetermined. The at least one consensus module is configured to determine the consensus based on the intersection traffic flow pattern and operational details of the target traffic control device.

In other features, the at least one recruitment module is configured to direct the worker vehicles to the target region to increase reporting probability of status information regarding the target traffic control device.

In other features, the at least one recruitment module is configured to swarm the worker vehicles to the target region to increase observation of the target traffic control device.

In other features, the at least one consensus module is configured to continue to collect additional information regarding the target traffic control device from the worker vehicles and update the consensus based on the addition information to increase a confidence level in the consensus.

In other features, the at least one consensus module is configured to determine a penalty cost for one of the worker vehicles to re-route and travel through target region and transmit the penalty cost to the one of the worker vehicles to control whether the one of the worker vehicles travels through the target region.

In other features, the at least one consensus module is configured to determine an attractiveness value for one of the worker vehicles to re-route and travel through the target region, and transmit the attractiveness value to the one of the worker vehicles to control whether the one of the worker vehicles travels through the target region. The attractiveness value is based on the penalty cost, a severity of event value, and an observation confidence level.

In other features, the at least one consensus module is configured to update the consensus based on a first weighting of perception data received from the worker vehicles and a second weighting of out-of-band data. The first weighting decreases over time. The second weighting increases over time.

In other features, the cloud-based network device further in a targcludeset region announcement and maintenance module configured to transmit a targeted region announcement for the target traffic control device to the worker vehicles and the onlooker vehicles indicating i) there is an issue with the target traffic control device, ii) the target region affected by the issue, and iii) vehicles affected by the issue.

In other features, the at least one traffic control device avoidance module is configured to virtually form a barricade around the traffic control device by controlling the other traffic control devices to prevent the onlooker vehicles from driving through the targeted region.

In other features, the at least one traffic control device avoidance module is configured to signal the onlooker vehicles to re-route around the target region.

In other features, the cloud-based network device further includes an infrastructure integration module configured to signal a municipality device to initiate maintenance on the target traffic control device.

In other features, a traffic control device monitoring and anomaly mitigating system is provided and includes: the cloud-based network device; the target traffic control device; and the other traffic control devices. A control module of the cloud-based network device is in communication with at least one of the target traffic control device and the other traffic control devices.

In other features, the traffic control device is a passive device or an active device.

In other features, a vehicle is disclosed and includes: a perception module configured to collect sensor data and out-of-band data regarding a traffic control device; and a control module. The control module is configured to: determine a scouter probability value of whether to operate as a scouter vehicle; determine a worker probability value of whether to operate as a worker vehicle; based on the scouter probability value and the worker probability value, determine whether to operate as a scouter vehicle or as a worker vehicle; while operating as a scouter vehicle, transmit the sensor data and the out-of-band data to a cloud-based network device indicating an anomaly associated with the traffic control device; and while operating as a worker vehicle, drive to a target region of the traffic control device and transmit the sensor data and the out-of-band data to the cloud-based network device to confirm whether an anomaly exists with the traffic control device.

In other features, the control module is configured to: receive a signal from the cloud-based network device indicating to re-route and drive toward the target region of the traffic control device; based on the signal, re-route to drive through the target region and while in the target region collect perception data regarding the traffic control device; and transmit the perception data regarding the traffic control device to the cloud-based network device.

In other features, the control module is configured to: receive a signal from the cloud-based network device indicating that there is anomaly associated with the traffic control device; and determine, based on the signal, whether to drive towards the target region or avoid the target region.

In other features, the control module is configured to: determine based on the scouter probability value and the worker probability value to operate as an onlooker vehicle; while operating as an onlooker vehicle, receive a signal from the cloud-based networked device; and based on the signal, drive to avoid the target region.

In other features, the control module is configured to: receive or determine a penalty cost associated with re-routing around the target region; and based on the penalty cost, drive through the target region.

In other features, the control module is configured to: receive or determine an attractiveness value for re-routing around the target region, where the attractiveness value is based on the penalty cost, a severity of events value, and an observation confidence level; and based on the attractiveness value, drive through the target region.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
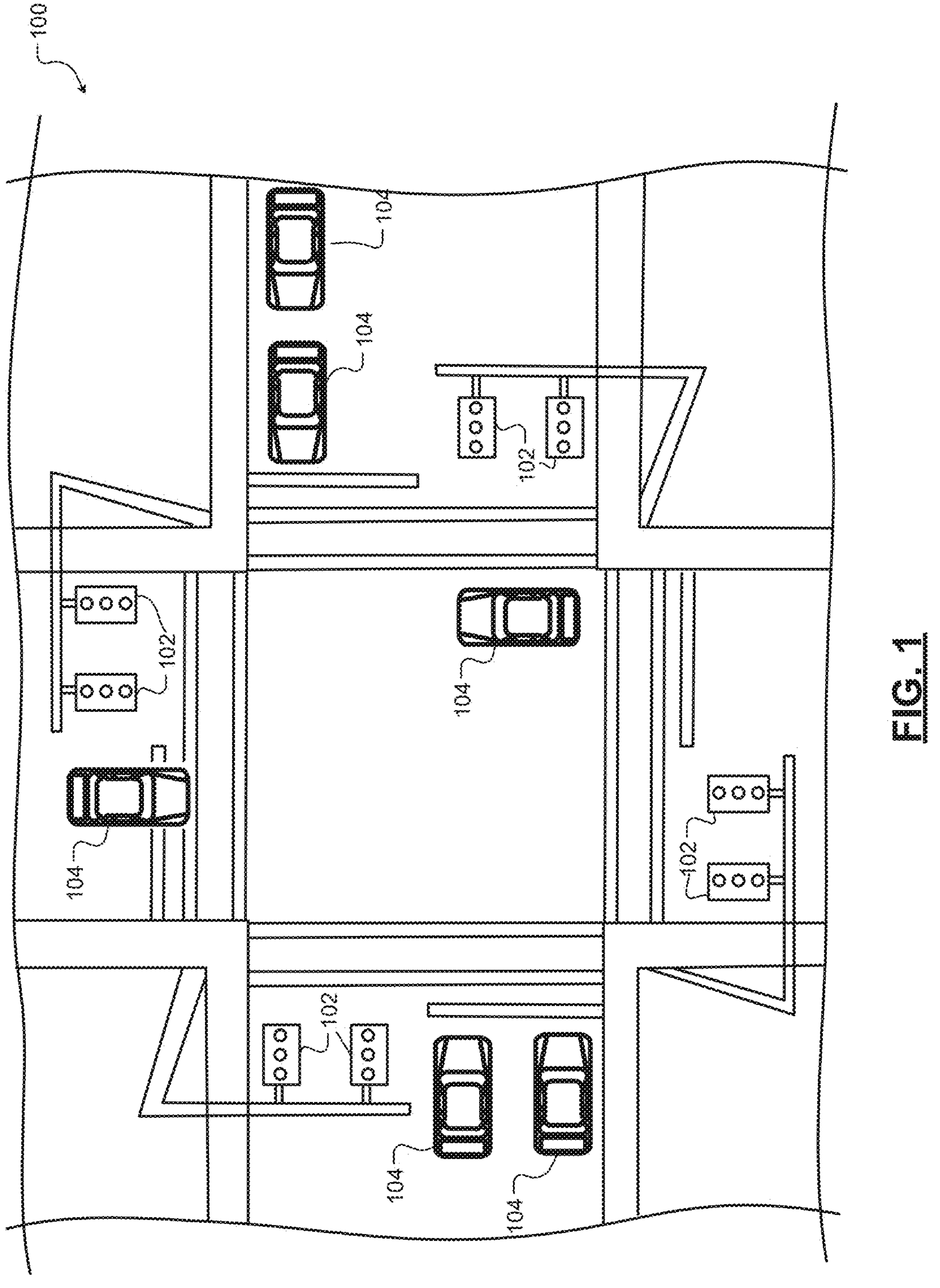
FIG. 1 is a top view of an example intersection including multiple traffic control device (TCDs) and vehicles.

As used herein, the term "traffic control device" refers a device used to control traffic. A TCD may be an active device (e.g., a traffic signal, an edge computing device, etc.) or a passive device (e.g., a traffic sign, a stop sign, a yield sign, a bike lane sign, a roundabout sign, a pedestrian crossing sign, etc.). A TCD may be a smart device for providing traffic, signal, vehicle, weather, and/or other information regarding a location at which the TCD is located. A TCD may be located at an intersection and/or along a road. A TCD may malfunction, be damaged, be partially or fully covered, be working improperly, be moved or missing, etc. These issues are herein referred to as TCD anomalies.

Vehicles can monitor, detect, communicate with and/or rely on information provided by and/or indicated by TCDs. Over time and for various reasons, TCDs can be damaged and/or have other anomalies that result in the TCDs not providing or indicating the appropriate information and/or not providing or indicating any information. This can be due to a collision, bad weather, vandalism, a power outage, an improperly operating power source, etc. When there is an anomaly associated with a TCD, a safety and/or efficiency issue can exist. The anomaly can cause, for example: one or more vehicles to drive faster or slower than appropriate for a given area; a vehicle to head in a wrong direction; a vehicle to collide with another vehicle, a pedestrian, or a cyclist; a vehicle to decelerate when deceleration is not appropriate; etc.

The examples set forth herein include systems and methods for detecting, monitoring and mitigating TCD anomalies. The systems include a cloud-based network device and vehicles monitoring statuses of TCDs and performing operations when TCD anomalies are detected. The operations are performed to confirm the anomalies, prevent inappropriate vehicle operation due to the anomalies, to mitigate the anomalies, and/or to have maintenance done on the corresponding TCDs to remove the anomalies. The operations are efficiently performed for quick response time from when the anomalies are initially detected.

The examples systems are collaborative active swarming systems that are implemented for partially and fully autonomous vehicles. In an embodiment, the vehicles are connected autonomous vehicles (CAVs) and thus operate in a CAV domain to collectively identify, monitor and mitigate road infrastructure TCD malfunctioning operations. The methods implemented include a collaborative swarming mechanism implemented by the CAVs to adaptively adjust vehicle motion planning to identify, confirm, monitor, and mitigate road infrastructure TCD anomalies including TCD malfunctioning issues. In an embodiment, an elastic probabilistic adjustment algorithm is implemented by each vehicle to identify and confirm malfunctioning TCDs in-situ. A bio-inspired CAV swarming algorithm is implemented to adjust vehicle motion trajectory to increase accuracy and decrease an amount of time associated with observing TCDs with anomalies. A probabilistic counting algorithm is implemented to aggregate positive/null reports from individual observing vehicles through a time-evolution discount.

The examples include identifying malfunctioning TCDs, continuously monitoring and tracking statuses of malfunctioning TCDs, and helping other incoming vehicles to mitigate the negative impacts of the malfunctioning TCDs. Some example TCD malfunctioning events include: malfunctioning traffic lights; highway and/or lane closures; and a stop sign that is missing, misplaced, and/or damaged.

Vehicles as referred to herein may be operating as a scouter, a worker, or an onlooker. A scouter vehicle is a vehicle that initially discovers an anomaly associated with a TCD. A worker vehicle is a vehicle that may have been informed of the anomaly by the scouter, a cloud-based network device, or other network device or vehicle and is performing operations to confirm or disconfirm the anomaly and/or check the status of the corresponding TCD. An onlooker vehicle is a vehicle that benefits from findings of one or more scouter vehicles and/or one or more worker vehicles. The scouter, worker, and onlooker may perform operations based on statuses of the TCDs to prevent collisions such as driving the corresponding vehicle around and/or away from areas associated with TCD anomalies. A vehicle may drive to where a TCD issue exists to assist in generating a consensus as to the status of the anomaly associated with the traffic control device or to avoid an area (or target region) of the TCD.

FIG. 1 shows an example intersection 100 including multiple traffic control device (TCDs) 102 (e.g., traffic lights) and vehicles 104. Each of the vehicles 104 may be a non-autonomous vehicle, a partially autonomous vehicle, or a fully autonomous vehicle. Each of the vehicles 104 may operate as any of the vehicles referred to herein. When one of the traffic lights (or TCDs) is malfunctioning (or has an anomaly), one or more (typically 1 or 2) of the vehicles 104 operates as a scouter vehicle and detects the anomaly. One or more of the vehicles 104 may operate as worker vehicles and another one or more of the vehicles may operate as onlooker vehicles.

Figure 2:
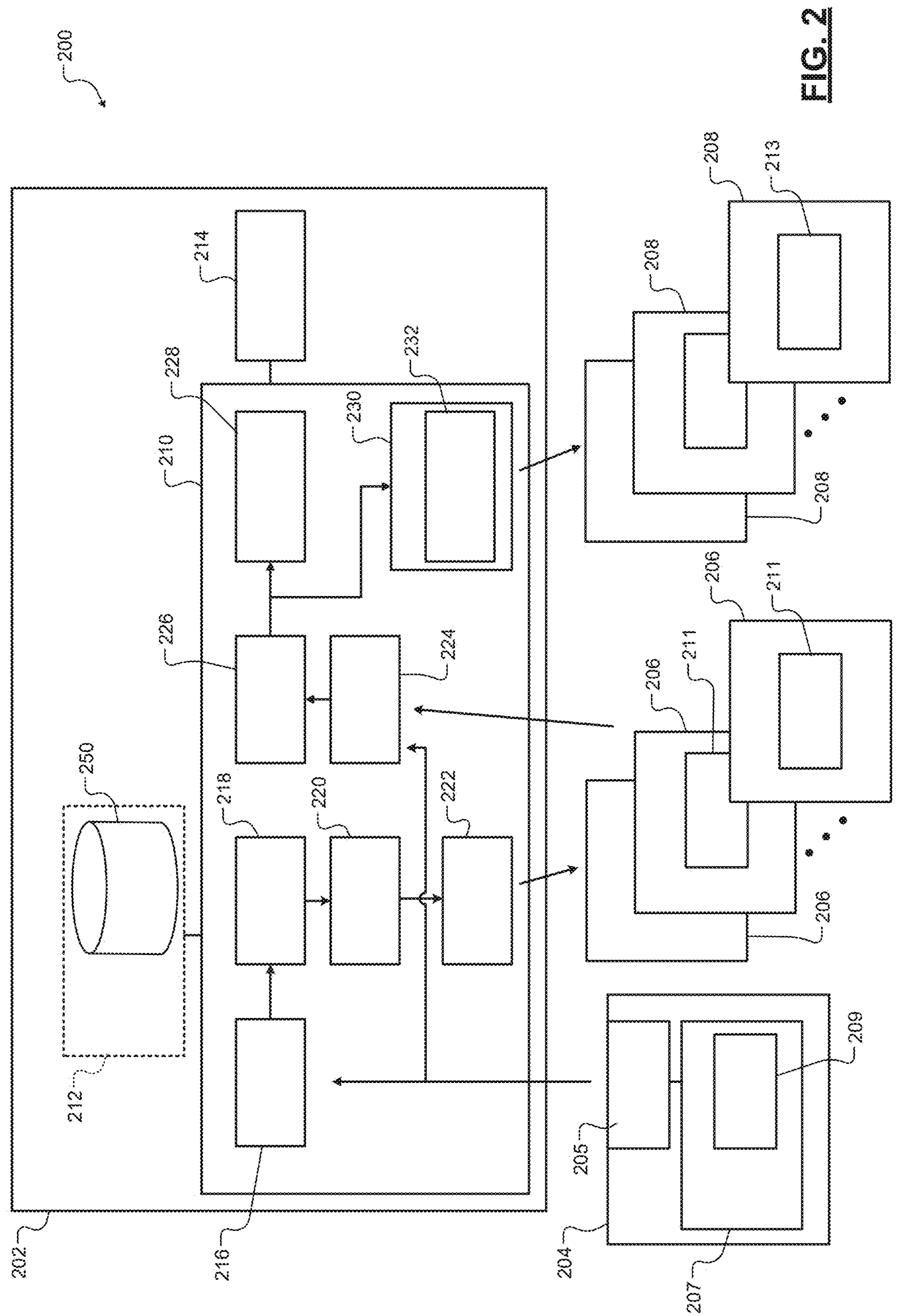
FIG. 2 is a functional block diagram of an example TCD monitoring and anomaly mitigating system in accordance with the present disclosure.

FIG. 2 shows a TCD monitoring and anomaly mitigating system 200 that includes a cloud-based network device 202, a scouter vehicle 204, worker vehicles 206, and onlooker vehicles 208. The cloud-based network device 202 collects information regarding TCDs from the vehicles 204, 206 and provides swarming instructions to the worker vehicles 206 and advisory and re-routing information to the onlooker vehicles 208. The scouter vehicle 204 may include a transceiver 205 and a control module 207 that implements a perception module 209. The worker vehicles 206 may include transceivers (not shown in FIG. 2) and control modules (not shown in FIG. 2) that implement perception modules 211. The onlooker modules 208 may include transceivers (not shown in FIG. 2) and control modules (not shown in FIG. 2) that implement navigation modules 213. The transceivers of the vehicles 204, 206, 208 may communicate with the transceiver 214.

The cloud-based network device 202 may be a central office device, a back-office device, a service provider device, etc. and include a control module 210, a memory 212, and a transceiver 214. The control module 210 may implement a reporting module 216, an assessment module 218, a recruitment module 220, a swarm routing module 222, a hazard consensus module 224, a hazard mitigation module 226, an infrastructure integration module 228, and an advisory module 230.

The scouter vehicle 204 collects perception information such as sensor data (e.g., exterior camera data), map data, etc. regarding a TCD. This data, referred to as first perception data, is provided to the reporting module 216, which reports the first perception data to the assessment module 218. The assessment module 218 determines whether a TCD anomaly exists for the TCD. If yes and/or there is a high probability that there is a TCD anomaly for the TCD, then the recruitment module 220 may increase probability of a vehicle being a worker vehicle and driving passed the TCD and reporting status of the TCD.

The swarm routing module 222 instructs the worker vehicles 206 to drive toward and/or re-route to drive toward the area in which the TCD is located to confirm or disconfirm that there is an anomaly with the TCD. The worker vehicles 206 drive towards and/or reroute to drive towards the TCD. Perception data from the worker vehicles is provided to the hazard consensus module 224, which creates a consensus of the status of the TCD based on perception information from the vehicles 204, 206, map data regarding the TCD, municipality data regarding the TCD, etc. The hazard consensus module 224 provides the consensus to the hazard mitigation module 226, which informs municipalities such as a department of transportation (DOT) office, a city office, a maintenance office, etc. of the consensus status of the TCD such that actions can be taken to address the anomalies of the TCD and mitigate issues associated with the TCD.

The infrastructure integration module 228 may report to the municipalities the TCD status and other information regarding the TCD such as the location, the type of TCD (active, passive, smart, etc.), the model number of the TCD, when the TCD was last monitored, and whether the TCD is malfunctioning, is missing, or is damaged. This allows the municipality to schedule maintenance for the TCD.

The advisory module 230 provides advisory information regarding the TCD to the onlooker vehicles 208. This may include the status of a TCD, paths to take to avoid the area having the TCD, time associated with continuing on a current route that passes through the area with TCD, time associated with re-routing, etc. The advisory module may include a re-routing module 232 that generates re-routing instructions to avoid the area having the TCD. Navigation modules 213 of the onlooker vehicles 208 may receive the advisory information and/or re-routing instructions and cause the onlooker vehicles to drive around and/or away from the area (e.g., an intersection) of the TCD.

The onlooker vehicle 208 performs operations based on the advisory information and re-routing information. This may include driving around and/or avoiding the area with the TCD.

The memory 212 may include a map database 250, which includes TCD information such as TCD locations, types, etc. The memory 212 may also store TCD statuses as indicated by the vehicles 204, 206 and status consensuses of TCDs as determined by the vehicles 204, 206 and/or the control module 210 of the cloud-based network device 202. A TCD consensus may be determined as further described below.

Other operations performed by the cloud-based network device 202 and the vehicles 204, 206, 208 are further described below.

Figure 3:
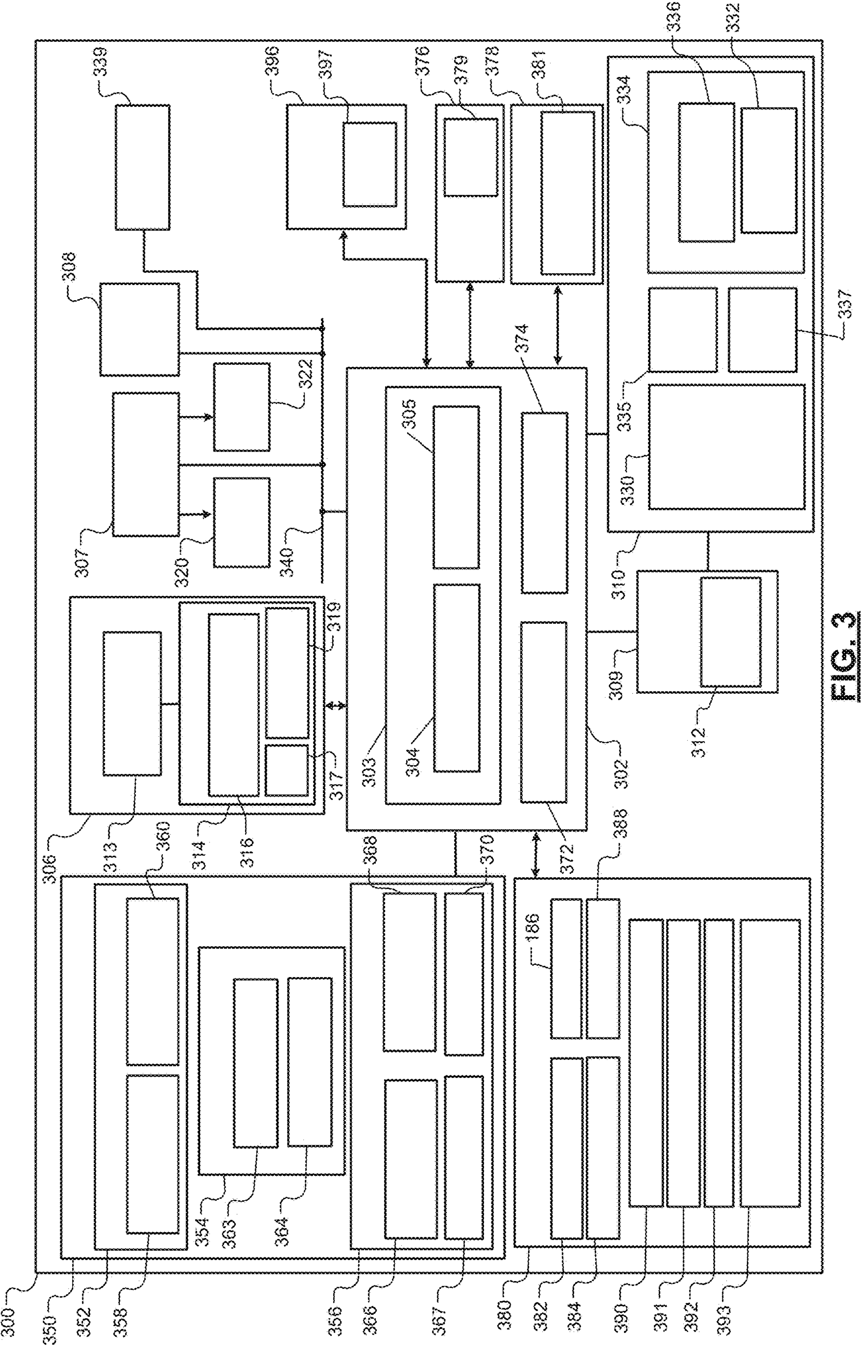
FIG. 3 is a functional block diagram of an example vehicle of the TCD monitoring and anomaly mitigating system of FIG. 3 in accordance with the present disclosure.

FIG. 3 shows a host vehicle 300 including a vehicle control module 302. The vehicle control module 302 includes a driving module 303 implementing a perception module 304 and a TCD anomaly module 305. The perception module 304 may perform the operations stated above for the perception modules 209 and 211 of FIG. 2 and other operations as described below. The perception module 304 and the TCD anomaly module 305 may detect TCD anomalies, report information regarding the anomalies, monitor TCDs to determine statuses of TCDs, confirm whether anomalies exist for TCDs, etc. The host vehicle 300 may operate as a scouter vehicle, a worker vehicle or an onlooker vehicle. Each of the vehicles 204, 206, 208 of FIG. 2 may be configured similarly as the host vehicle 300.

The driving module 303 and/or perception module 304 performs: perception (or situation) determining operations; object detection, identification, classification, and graphical and visual identification operations; data look-up, collection, and gathering operations; interaction timing operations; assisted driving operations; image overlay operations; dialog operations including providing speech, text, and/or haptic messages; etc. The vehicle control module 302 may perform various operations based on determinations made by the modules 303, 304, 305 and interactions with a driver and/or passenger of the host vehicle 300.

The host vehicle 300 further includes one or more power sources 309, a telematics module 306, an infotainment module 307, other control modules 308 and a propulsion system 310. The vehicle control module 302 may control operation of the host vehicle 300 including the propulsion system 310 and other system described below. The power sources 309 may include one or more battery packs, a generator, a converter, a control circuit, terminals for high and low voltage loads, etc., as well as one or more battery sensors 312 for detecting states of the power sources 309 including voltages, current levels, states of charge, etc.

The telematics module 306 provides wireless communication services within the host vehicle 300 and wirelessly communicates with service providers, network devices (e.g., cloud-based network devices, central office devices, and/or back-office devices), other vehicles, mobile devices, infrastructure devices, and other devices external and/or internal to the host vehicle 300. The telematics module 306 may support Wi-Fi®, Bluetooth®, Bluetooth Low Energy (BLE), Ultra-Wideband (UWB), near-field communication (NFC), cellular, legacy (LG) transmission control protocol (TCP), long-term evolution (LTE), and/or other wireless communication and/or operate according to Wi-Fi®, Bluetooth®, BLE, UWB, NFC, cellular, and/or other wireless communication protocols. The telematics module 306 may include one or more transceivers 313 and a navigation module 314 with a global positioning system (GPS) and GNSS (or Global Navigation Satellite System) receiver 316. The navigation module 314 may include an inertial measurement unit (IMU) 317 and an odometer/wheel sensor 319. The transceivers 313 wirelessly communicate with network devices internal and external to the host vehicle 300 including cloud-based network devices, central stations, back offices, and portable network devices. The transceivers 313 may perform pattern recognition, channel addressing, channel access control, and filtering operations.

The navigation module 314 executes a navigation application to provide navigation services. The navigation services may include location identification services to identify where the host vehicle 300 is located. The navigation services may also include guiding a driver and/or directing the host vehicle 300 to a selected location. The navigation module 314 may communicate with a central station to collect map information indicating levels of traffic, transportation object identification and locations (e.g., locations and types of signs), path information, weather information, etc. As an example, if the host vehicle 300 is an assisted and/or automated driving vehicle, the navigation module 314 may direct the vehicle control module 311 along a selected route to a selected destination. The GPS and GNSS receiver 316 may provide: TCD location information; velocity and/or direction (or heading) of the host vehicle 300, other vehicles, and objects (e.g., pedestrians and cyclists); and/or global clock timing information.

The infotainment module 307 may include and/or be connected to an audio system 322 and/or a video system including one or more displays (one display 320 is shown). The displays 320 and audio system 322 may be part of a human machine interface. The displays 320 may include cluster and/or center console displays, head-up displays, etc. Haptic devices (e.g., steering wheel and/or seat vibration devices) may be used in addition to the displays and the audio system 322 to interact with a vehicle occupant such as a driver or passenger. This interaction is further described below. Messages may be displayed, audibly played out, and/or indicated via the displays 320, the audio system 322, the haptic devices 324, and/or via one or more other output devices.

The infotainment module 307 may provide various information, warnings, and proactive messages including: TCD status information; routing information, re-routing information, questions whether the host vehicle 300 should re-route from a current path to another path; whether driving operations are autonomously controlled, limited and/or prevented; gear shifter status; upcoming and currently being performed operations (e.g., braking, accelerating, turning operations); detected objects (or obstacles); vehicle status information; diagnostic information; prognostic information; entertainment features and information; etc. The infotainment module 307 may be used to guide a vehicle operator to a certain location, indicate trip estimations (e.g., distances to selected destinations), and other information.

The propulsion system 310 may include one or more torque sources, such as one or more motors and/or one or more engines (e.g., internal combustion engines). In the example shown in FIG. 3, the host vehicle 300 includes an engine 330 and one or more motors 332. The torque sources are independently controlled. The propulsion system 310 includes a motor control system 334 that includes the one or more motors 332 and a motor control module 336 that may control operation of the one or more motors 332 based on signals from the vehicle control module 311. The propulsion system 310 may include a gear selector and/or shifter 335 for setting a gear of a transmission 337 and/or for setting a drive state of one or more of the torque sources. The gear selector and/or shifter 335 may be an electronic selector (e.g., one or more electrical switches), a mechanical and/or electrical shifter, or other selector and/or shifter. The propulsion system 310 may be controlled based on position of an accelerator 339 (e.g., an accelerator pedal, a throttle plate, etc.).

The modules 302-308 may communicate with each other directly or indirectly via one or more buses 340, such as a controller area network (CAN) bus and/or other suitable interface. The vehicle control module 302 may control operation of vehicle modules, devices and systems based on feedback from sensors 350 and information and/or instructions received from a cloud-based network device (e.g., the cloud-based network device 202 of FIG. 2).

The sensors 350 may include exterior sensors 352, interior sensors 354, and other sensors 356. The exterior sensors 352 may include radar and/or lidar sensors 358 and imaging and audio devices (e.g., visual spectrum cameras, long-wave infrared cameras, short-wave infrared cameras, ambient light sensors, and microphone or microphone array) 360.

The exterior sensors 352 may be used to detect objects external to the host vehicle 300 and/or in a path of the host vehicle 300.

The interior sensors 354 may include one or more interior imaging sensors (e.g., cameras) 363, and a microphone or microphone array 364. The interior sensors 354 may be part of a driver monitoring system (DMS). The cameras 363 may be used to detect, track and/or monitor vehicle occupants including detecting locations of vehicle occupants in the vehicle, anatomical features (e.g., face, arms, hands, legs, etc.) of the vehicle occupants, head locations and/or eyes, etc.

The other sensors 356 may include a gear selector and/or shifter sensor 367, a vehicle speed sensor 366, acceleration sensors (e.g., longitudinal and lateral acceleration sensors) 368, and a fuel level sensor 370, as shown, and other sensors such as an inclinometer, an engine temperature sensor, and an engine oil pressure sensor. Additional sensors may also be included such as brake system sensors (a brake sensor 379 is shown) and steering system sensors (a steering angle sensor 381 is shown). The gear selector and/or shifter sensor 367 generates a signal indicative of a state of the gear selector and/or shifter 335.

The driving module 303 may use machine learning for facial recognition, determining locations of occupant limbs, for anatomical feature recognition, object classification including to identify and/or classify pedestrians, cyclists, and vehicles (e.g., oncoming traffic), as well as for probable trajectory determination of each detected, identified and/or classified object. The driving module 303 may determine the locations of objects based on feedback from the sensors 350.

The vehicle control module 302 may also include a mode selection module 372 and a parameter adjustment module 374. The mode selection module 372 may select a vehicle operating mode such as whether the vehicle is to operate as a scouter, a worker or as an onlooker. The parameter adjustment module 374 may be used to adjust parameters of the host vehicle 300. The vehicle control module 302 may perform autonomous operations based on interaction with a vehicle occupant. As an example, the vehicle control module 302 may operate in a fully or partially autonomous mode and may control the propulsion system 310, a brake system 376, and a steering system 378. In an embodiment, the vehicle control module 302 controls operation of the systems 310, 376 and 378 based on or without interactions with a vehicle occupant. The vehicle control module 302 may i) perform autonomous operations such as steering, braking, accelerating, etc., and/or ii) display and/or audibly playout messages, perform haptic operations via haptic devices, and/or output messages and/or corresponding signals via other output devices.

In an embodiment, the driving module 303 uses computer vision, machine learning and cloud computing to identify, communicate, and evaluate scenarios where a moving host vehicle should yield to pedestrian(s), an obstructed roadway, and/or oncoming (right-of-way) traffic. The driving module 303 visualizes and takes into consideration in real-time pedestrians, roadway obstructions and oncoming traffic and performs operations to provide enhanced situation awareness to vehicle occupants.

The driving module 303 is configured to perceive the road ahead and surrounding areas based on outputs of sensors (e.g., cameras, radar sensors, and/or lidar sensors) and vehicle-to-everything (V2X) communication including vehicle-to-vehicle communication, vehicle-to-mobile device communication, vehicle-to-infrastructure communication, and other communication (e.g., vehicle to distributed network communication).

The host vehicle 300 may further include the memory 380. The memory 380 may store sensor data 382, parameters 384, applications 386, algorithms 388, historical data 390, on-board inputs 391, off-board inputs 392 from other devices external to the host vehicle 300 and other data 393 (e.g., TCD data and information). The sensor data and parameters may include TCD type and location, TCD images, TCD characteristics, and other data and parameters such as vehicle location, vehicle speed, vehicle acceleration, battery state of charge, fuel level, etc. applications 386. The applications 386 may include applications executed by the modules 302-308.

Although the memory 380 and the vehicle control module 302 are shown as separate devices, the memory 380 and the vehicle control module 302 may be implemented as a single device. The memory 380 may also store historical data 390 and other data 392 such as driver driving patterns, driver fueling patterns, driver stopping patterns, driver pickup patterns, other driver patterns, data collected by and/or generated by at least one of the modules 302, 303, traffic data, navigation data, map data, GPS data, path data, speed data, and acceleration data, etc.

The vehicle control module 302 may control operation of the propulsion system 310, the video system including the display 320, the audio system 322, the haptic devices, the brake system 376, the steering system 378, a seating system 396, and/or other devices and systems according to parameters set by the modules 302, 303, 307, 308, 374. The seating system 396 may include seat sensors 397 for detecting presence of an occupant and/or change in occupants, for example, change in a driver. The vehicle control module 302 may set at least some of the parameters based on signals received from the sensors 350.

The vehicle control module 302 may receive power from the power sources 309, which may be provided to the propulsion system 310, the brake system 376, the steering system 378, the seating system 396, etc. Power supplied to the haptic devices, the motors 332, the brake system 376, the steering system 378, the seating system 396, and/or actuators thereof may be controlled by the vehicle control module 302 to, for example, adjust: motor speed, torque, and/or acceleration; braking pressure; steering wheel angle; pedal position; state of haptic devices; etc. This control may be based on the outputs of the sensors 350, the navigation module 314, the GPS and GNSS receiver 316, the data and information received from external devices, and the data and information stored in the memory 380.

The vehicle control module 302 may determine various parameters including a vehicle speed, a motor speed, a gear state, an accelerator position, a brake pedal position, an amount of regenerative (charge) power, an amount of auto start/stop discharge power, and/or other information. The vehicle control module 302 may control operations of the systems 310, 376, 378 based on the stated parameters. The driving module 303 may display vehicle status information based on the stated parameters.

The host vehicle 300 can include various systems for assisting a driver, for performing autonomous operations, and/or for indicating to a vehicle occupant information regarding an environment of the host vehicle. For example, a host system may include a navigation system that provides map information indicating lane boundaries, street locations, TCD locations, TCD types, speed limits, geographical locations of selected destinations, etc. The host system may provide the driver with instructions for driving to a selected destination and/or may perform autonomous operations such as braking, steering, and accelerating operations to drive the vehicle to the destination based on the map information and/or information regarding TCDs.

As another example, the host vehicle 300 may include object detection and collision warning systems for detecting impending objects and performing countermeasures and/or taking evasive action to prevent a collision. The vehicle control module 302 determines locations of the objects relative to the host vehicle 300 and trajectories of the objects and the host vehicle 300. If it is determined that the host vehicle 300 is likely to collide with one of the objects, one or more warning signals may be generated to indicate to the driver and/or the object of concern of the potential collision. These warnings may be provided in addition to digital gateways and other information described herein. The vehicle control module 302 may also or alternatively perform one or more other countermeasures (e.g., apply brakes to decelerate the host vehicle, change a steering angle of the host vehicle, etc.) to prevent a collision.

Figure 4:
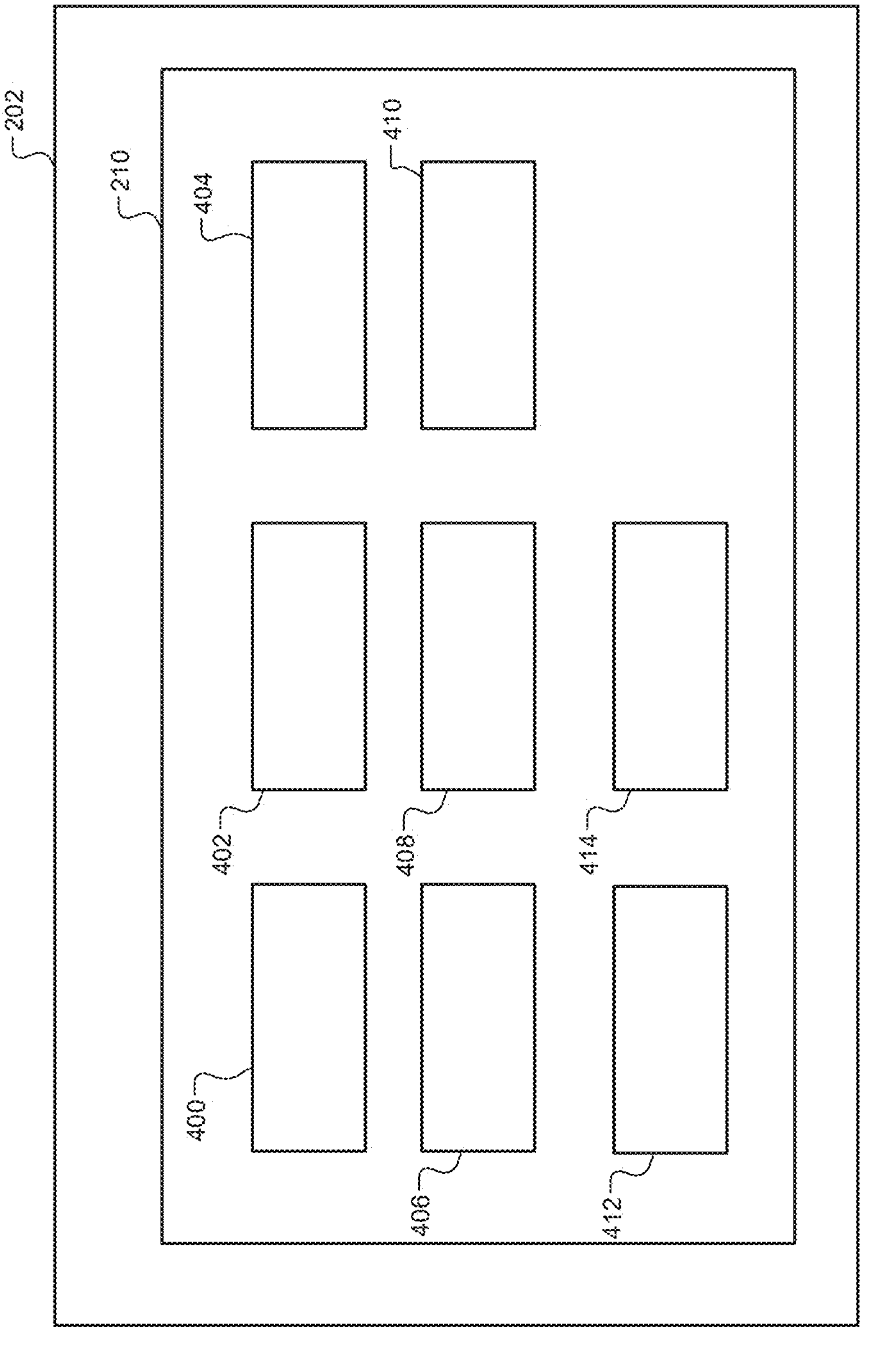
FIG. 4 is a functional block diagram of a portion of a cloud-based network device of the TCD monitoring and anomaly mitigating system of FIG. 3.

FIG. 4 shows the cloud-based network device 202 including the control module 210, which may include an initial scouting module 400, a first worker recruitment module 402, a second worker recruitment module 404, a distributed consensus building module 406, a consensus and belief maintenance module 408, a target region announcement and maintenance module 410, a TCD barricade module 412, and a vehicle re-routing module 414. Operations of these modules are described with respect to FIG. 5-10.

Figure 5:
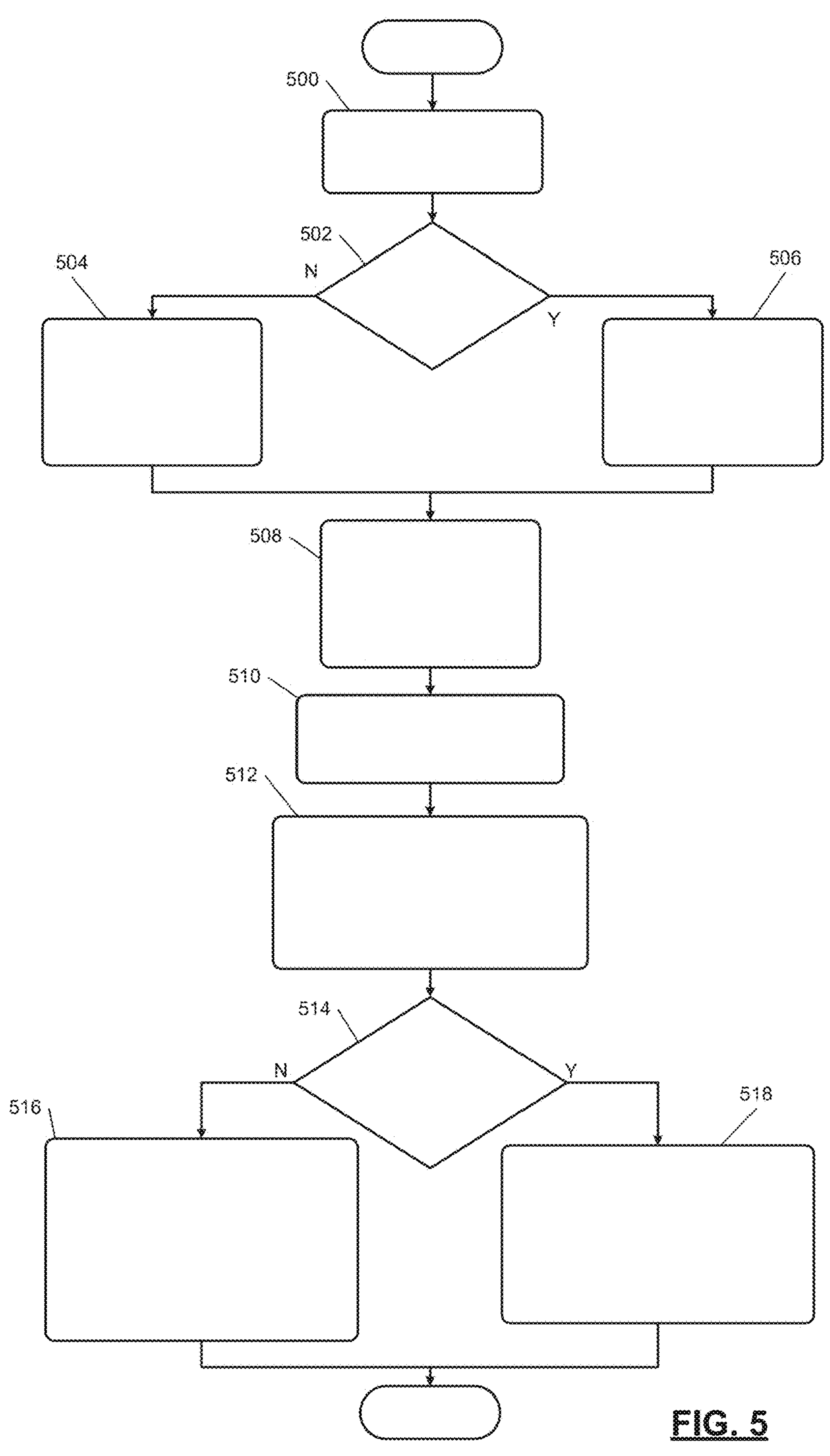
FIG. 5 illustrates an example TCD monitoring and mitigating method implemented by a cloud-based network device in accordance with the present disclosure.

FIG. 5 shows a TCD monitoring and mitigating method implemented by a cloud-based network device. The operations of FIG. 5 may be iteratively performed. The operations may be performed by the control module 210 of the cloud-based network device 202 of FIGS. 2 and 4 for each TCD with an anomaly. In an embodiment, the cloud-based network device in collaboration with scouter and worker vehicles operate as a collaborative swarming system in a CAV domain to collectively identify, monitor and mitigate road infrastructure TCD malfunctioning operations.

At 500, the initial scouting module 400 may receive initial scouting information from one or more scouter vehicles. This may include an indication that there is an anomaly with a particular TCD that has been detected by the one or more scouter vehicles. The TCD information may include a TCD identifier and the one or more anomalies detected for the TCD.

Figure 6:
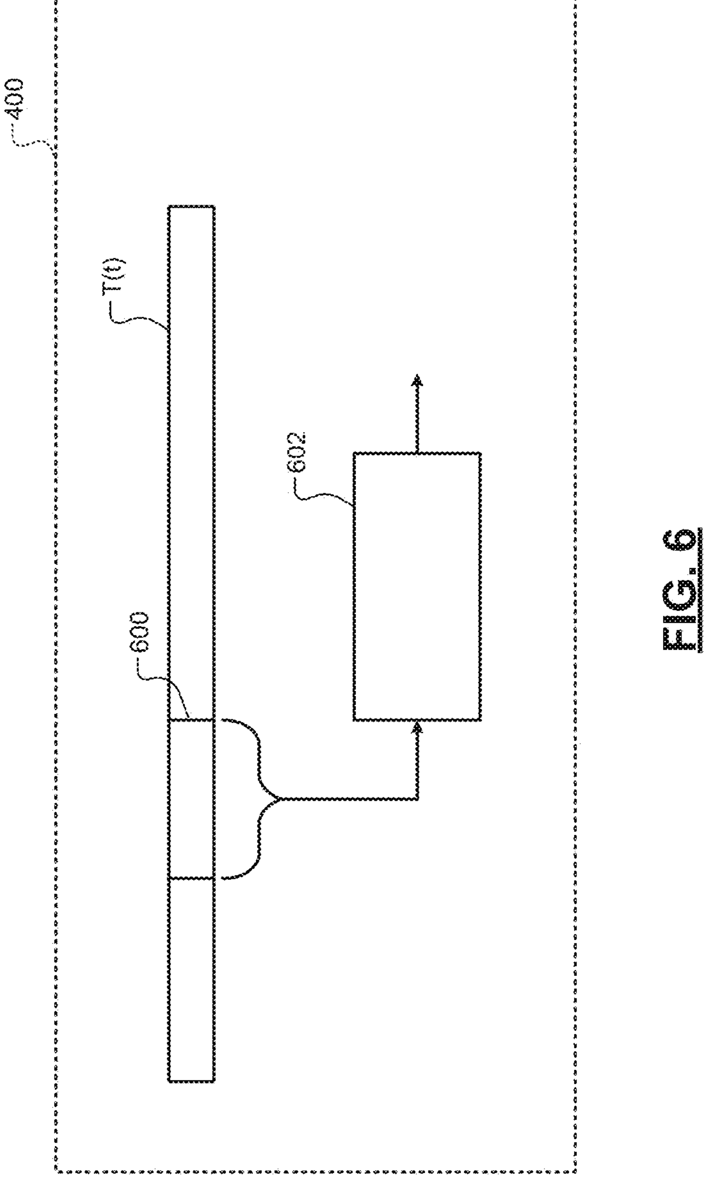
FIG. 6 is a functional block diagram illustrating anomaly status determination for a TCD via an initial scouting module in accordance with the present disclosure.

FIG. 6 shows example diagram illustrating anomaly status determination for a TCD (such as the TCD having the one or more anomalies) via the initial scouting module 400. The initial scouting module 400 collects TCD information for the TCD from the one or more scouter vehicles. This may include i) perception information collected by the scouter vehicles via sensors, ii) real-time analytics, and iii) out-of-band (OOB) information collected by vehicle telematics modules. The information received via the telematics modules may include map data and municipality data (e.g., state DOT report data, police report data, data from surveillance systems, etc.). The surveillance system data may be from close circuit television (CCTV) cameras, drones, etc. The OOB information may be provided from the scouter vehicles to the cloud-based network device 202 or may be received directly from service providers, municipality offices, surveillance systems, etc. The OOB information may be from an independent information source that is fed into the corresponding TCD monitoring and anomaly mitigating system. The host vehicle may compare, for example, camera data with OOB data to detect discrepancies and/or anomalies associated with TCD. As an example, the OOB data may indicate how a TCD should look and operate, where a TCD should be located, and the type of the TCD. The camera data may not match or be consistent with the OOB data. This would indicate that there is an anomaly associated with the TCD.

In an embodiment, a learning-based real-time data analytics procedure is deployed in cloud to scout a traffic flow anomaly associated with the TCD. The real-time analytics is a muti-modality approach for initial TCD anomaly detection and may be implemented in the scouter vehicles and/or by the control module 210 of the cloud-based network device 202. The real-time analytics may include monitoring vehicle traces (or paths of vehicles) through, for example, an intersection, where each vehicle has a trace T (t) with corresponding position, velocity, and heading information. The trace T (t) for each vehicle is tracked over time t and provided for a selected window W of time 600 to a neural network 602 (e.g., a transformer neural network). The window W may be of a predetermined duration and be associated with a predetermined number of sets of data for each vehicle, where each set includes location, velocity, and heading information. The vehicle paths may be paths of scouter, worker, onlooker, and/or other vehicles. The window size may be, for example, 1-5 hours in length.

The neural network 602, based on historical data, classifies the intersection traffic flow pattern as a stop-and-go pattern, a traffic-light protected pattern, or as undetermined. A stop-and-go pattern may occur, for example, when the TCD is a stop sign and vehicles stop for a period at the stop sign and then accelerator through the intersection. A stop-and-go pattern has a more ad-hoc traffic driving pattern. A traffic-light protected pattern may occur, for example, when the TCD is a traffic light, which may be red or green and thus traffic may stop if red or may continue at a current speed when green. A traffic-light protected pattern has a more coordinated pattern. For example, 50% of cars may stop at the light and the other 50% of cars may drive through the light without stopping if, for example, the light is red 50% of the time and green for the other 50% of the time. The undetermined status means that it could not be determined whether the pattern is a stop-and-go pattern or a traffic-light protected pattern. The traffic flow pattern is reported to the cloud-based network device and used in determining an anomaly associated with the TCD.

Referring to FIG. 5, at 502, the control module 210 may determine whether a worker vehicle is a non-autonomous vehicle or an autonomous vehicle. If non-autonomous, operation 504 may be performed, otherwise operation 506 may be performed. An elastic probabilistic adjustment algorithm of CAVs may be implemented to identify and confirm malfunctioning TCDs in-situ.

At 502, the first worker recruitment module 402 directs worker vehicles to a target region where the TCD with the one or more anomalies is located to increase reporting probabilities of status information for the TCD.

At 504, the second worker recruitment module 404 "swarms" worker vehicles to targeted region to increase observation of TCD anomalies. The term swarm refers to the control module 210 instructing the worker vehicles to stay on a current path through the targeted region or to re-route to drive through the targeted region.

Figure 7:
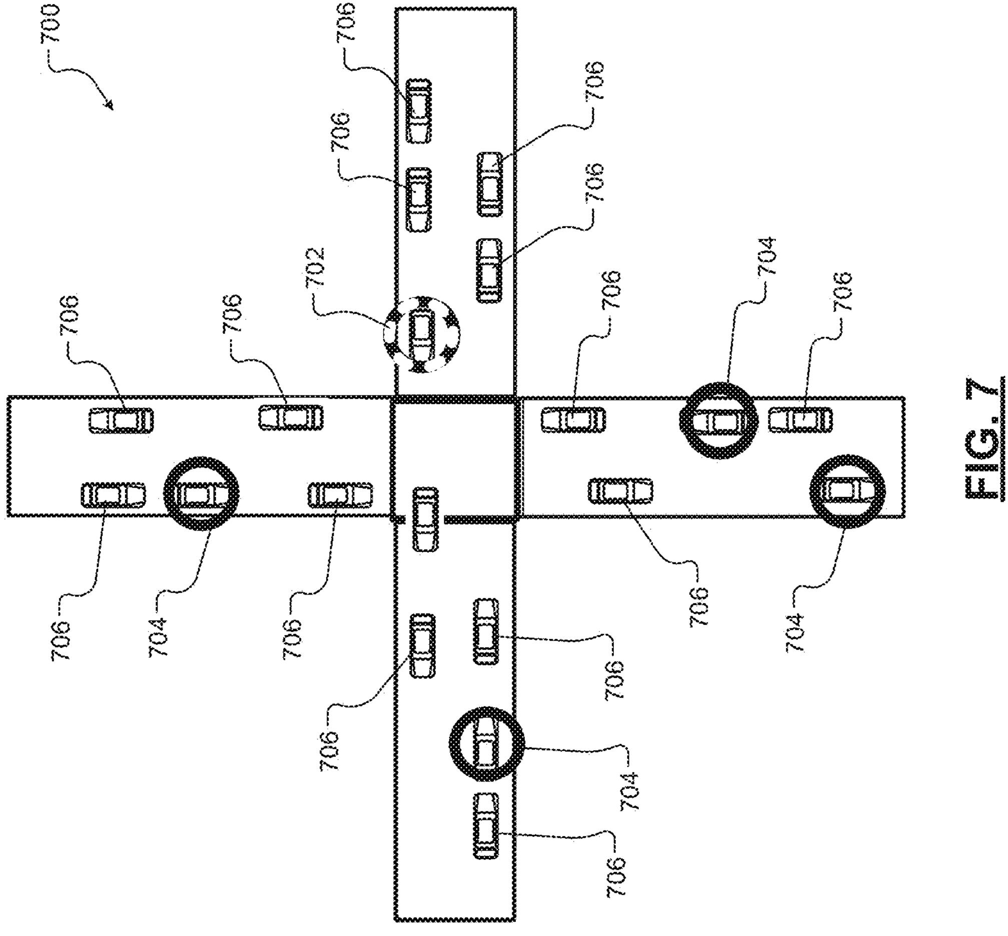
FIG. 7 is a top view of an example target region including an intersection through which scouter and worker vehicles are traveling.

FIG. 7 shows an example target region 700 including an intersection and nearby scouter and worker vehicles. The intersection may have a TCD with one or more anomalies. The example shows a scouter vehicle 702 (circled with a dashed line), worker vehicles 704 (circled with a solid line) and other vehicles 706, which may include onlooker vehicles.

Due to limited computing resources and cellular cost budgeting, each vehicle i could upload its detection data with a probability of $P_{is}$ Or $P_{iw}$. $P_{is}$ may be represented by equation 1. $P_{iw}$ may be represented by equation 2. Equation 1 determines a probability that a vehicle performs as a scouter vehicle for the given geographic region, where $f$ is a function and ρ is vehicle density (i.e., number of vehicles in neighborhood (or target region). For example, if $P_i$ is 1% and there are 100 vehicles, then there is a 1% chance that a vehicle will be a scouter vehicle. Equation 2 determines a probability that a vehicle performs as a worker vehicle for the given geographic region, where $l_s$ is initial scouter vehicle's observation confidence level (i.e., a confidence that the initial scouter vehicle has in the observation made for the TCD of concern). Equation 2 may be used for early-stage worker vehicles.

$$P_{is} = f\left(\frac{1}{\rho}\right) \quad (1)$$

$$P_{iw} = f\left(\frac{1}{\rho}\right)\left(\frac{1}{l_s}\right) \quad (2)$$

Each vehicle may be provided with the probabilities by the cloud-based network device and/or may calculate $P_{is}$ and $P_{iw}$. Based on these probabilities and use of a pseudo-random number generator that generates a high or low value based on these probabilities, each vehicle operates as a scouter, a worker, or an onlooker. No vehicle operates as both a scouter vehicle and as a worker vehicle. Similarly, an onlooker vehicle does not operate as a scouter vehicle or as a worker vehicle.

In an embodiment, initial scouter (volunteering) vehicles and early worker (volunteering) vehicles are compensated by incentives or virtual incentives. As an example, the owners of these vehicles may receive discounts on certain vehicular services.

Referring to FIG. 5, at 508, the distributed consensus building module 406 forms a consensus regarding the status of the TCD of concern based on information from the scouter and worker vehicles. As an example, if a traffic light is working improperly, the consensus may indicate that the traffic light is working improperly and what the traffic light is doing (e.g., remaining on a single color, remaining on a certain color too long, blinking and shouldn't be blinking, not blinking and should be blinking, not on and should be on, etc.). As another example, if the TCD is a sign, the consensus may indicate that the sign is damaged, missing, out of place, etc. A bio-inspired CAV swarming algorithm may be implemented to adjust vehicle motion trajectory to increase accuracy of TCD observations and decrease time to make and receive the TCD observations.

Figure 8:
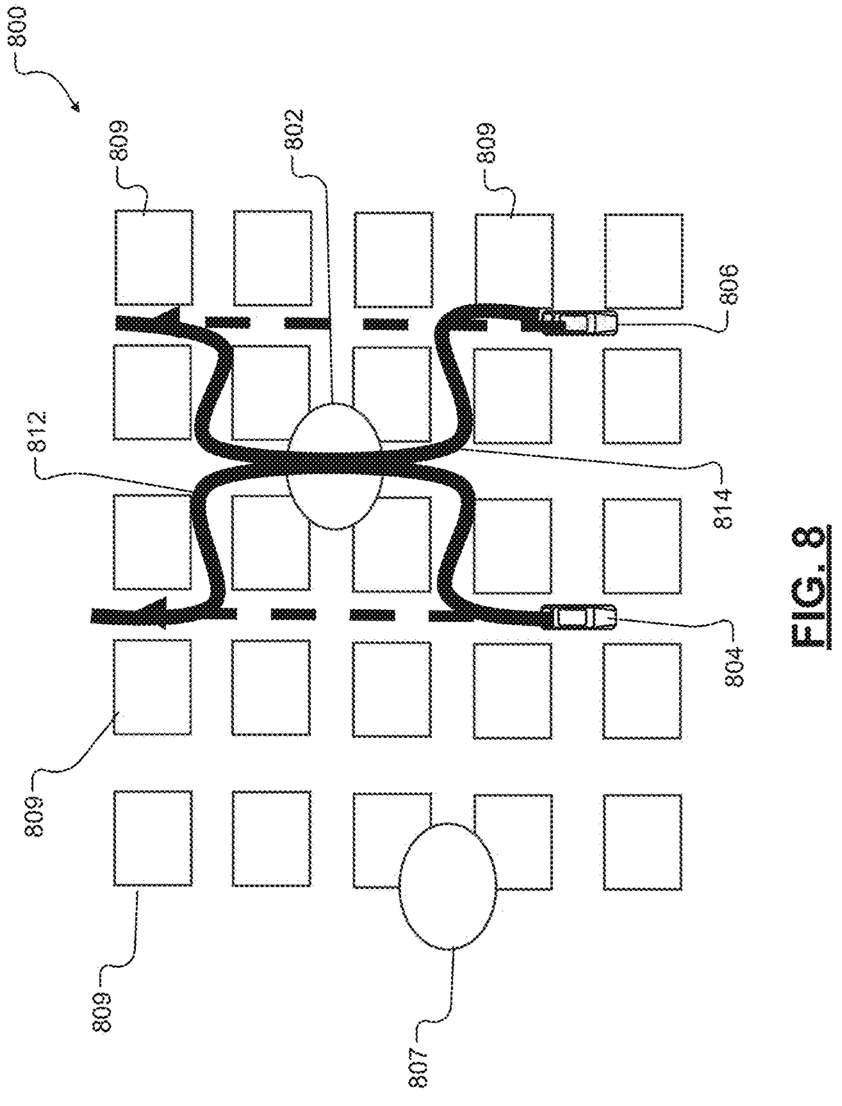
FIG. 8 is a top view of a geographical area illustrating a swarming operation performed in association with one of multiple intersections having a TCD with an issue (or anomaly) and in accordance with the present disclosure.

FIG. 8 shows a geographical area 800 including multiple intersections including one intersection area (or target region) 802 with a TCD having an anomaly and illustrating a swarming operation performed by two vehicles 804, 806. Another target region 807 is shown but in this example the worker vehicles 804, 806 are not detoured to that region. The intersections are between city blocks 809. Worker vehicles may detour from their original mobility trajectory (e.g., trajectories 808, 810) to follow detour trajectories (e.g., trajectories 812, 814) to observe the TCD of concern (or target TCD). This may occur by following an algorithmic procedure, which includes determining a penalty cost for performing a detour. A penalty cost may be determined by each of the worker vehicles according to equation 3, where $Q_i$ is the penalty cost, $T_{orig}$ is time associated with staying on original path, $T_{detour}$ is time associated with following detour path, i is the worker vehicle number, and Th is a threshold (e.g., 2 minutes). The threshold can be adjusted. If the penalty to take the detour is greater than the threshold Th, then the detour may not be taken, otherwise the detour may be taken.

$$Q_i = |T_{orig} - T_{detour}| \leq Th \quad (3)$$

For each targeted malfunctioning areas, its attractiveness to the worker vehicle may be determined according to equation 4, where $A_i$ is the attractiveness to the worker vehicle i to take the detour, $S_i$ is a severity of events, $L_i$ is a confidence level for the observation made by the worker vehicle of the TCD, and $Q_i$ is the penalty is following the detour. The higher the attractiveness value $A_i$, the more likely the worker vehicle is to drive through the target region. The lower the confidence level associated with a current consensus regarding the TCD, the higher the attractiveness value $A_i$. The higher the severity of the issue (or anomaly) associated with the TCD, the higher the attractiveness value $A_i$. The lower the penalty associated with re-routing and traveling through the target region, the higher the attractiveness value $A_i$.

$$A_i = \frac{\frac{S_i}{L_i}}{Q_i} = \frac{S_i}{Q_i L_i} \quad (4)$$

Among all of the targeted areas (e.g., the targeted areas 802, 807), a worker vehicle assigns its detour probabilities $P_i$ to region i according to equation 5.

$$P_i = \frac{A_i}{\sum_i A_i} \quad (5)$$

Referring to FIG. 5, at 510, the consensus and belief maintenance module 408 continues to collect information regarding the target TCD from worker vehicles. Although only two worker vehicles are shown in FIG. 8, any number of worker vehicles may be reporting information. An elastic probabilistic adjustment algorithm of CAVs may be implemented to identify and confirm malfunctioning TCDs in-situ.

Figure 9:
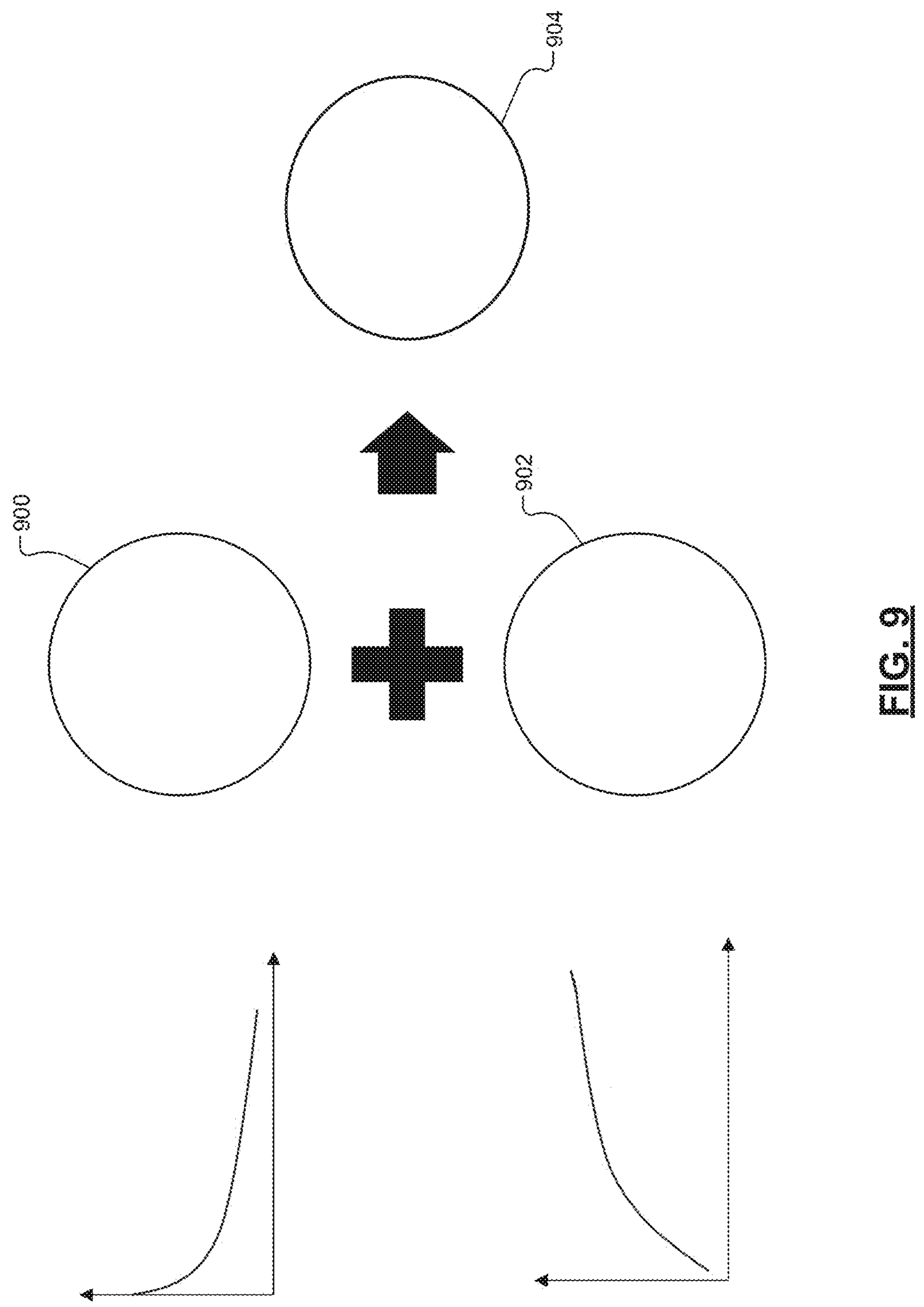
FIG. 9 is a diagram illustrating anomaly status determination based on information from an intra swarming system and one or more out-ot-band information channels in accordance with the present disclosure.

In an embodiment, a probabilistic counting algorithm to aggregate individual observer's positive/null reports through a time-evolution discount is implemented. FIG. 9 shows a diagram illustrating anomaly status determination based on information from an intra swarming system and one or more out-ot-band information channels. The weight given to information collected from scouter and worker vehicles in the swarm system is decreased over time as less vehicles are routed into the target areas (or areas with TCDs with anomalies). This is represented by curve $w_1(t)$. The weight given to data from OOB systems (e.g., DOT and police) increase over time as repairment is in place (i.e., as TCDs are getting repaired and/or as maintenance is being performed on the TCDs). This is represented by curve $w_2(t)$. The intra-swarming system data 900 and the OOB information channel data 902 is weighted and combined to determine an anomaly status 904 for each TCD of concern. This may be represented by equation 6, where A(t) is the anomaly status, $w_1(t)$ is the weight given the swarming data S(t) (or data from worker vehicles), and $w_2(t)$ is the weight give the OOB data O(t). In an embodiment, the anomaly status is a value between 0 and 1, where 0 indicates that no anomaly exists with the TCD and 1 indicates 100% that an anomaly exists with the TCD.

$$A(t) = w_1(t)S(t) + w_2(t)O(t) \tag{6}$$

Each worker vehicle (or observer) has its own observations regarding a TCD. The observations for a TCD gradually change over time. Maintenance may be performed on TCDs at different times. Thus, newer observations are trusted more than older observations. The weighting of the swarm data may be accomplished using an exponential decay function to adjust the weighting over time. New observations cancel out old observations. More weight can be given to certain observations that come from, for example, a more trusted source.

Referring to FIG. 5, at 512, the target region announcement and maintenance module 410 may transmit or broadcast a targeted region announcement for the target TCD indicating: i) there is an issue with the TCD, ii) the corresponding geographical region impacted by the issue, and iii) vehicles that may be affected by the issue. This announcement may be transmitted to be received by vehicles near and/or driving towards the impacted geographical region.

At 514, the control module 210 determines whether to indirectly or directly re-route one or more onlooker vehicles away from the target region. If the onlooker vehicles are indirectly re-routed, operation 516 is performed. If the onlooker vehicles are directly re-routed, operation 518 is performed.

At 516, the TCD barricade (or first TCD avoidance) module 412 virtually forms a barricade around the target TCD by controlling other TCDs of other geographical regions to effectively direct the onlooker vehicles around the target region and thus avoid the region having the TCD with the anomaly. For example, if a target traffic light at a target intersection in a city is experiencing an anomaly, timing of other traffic lights in surrounding intersections that direct traffic towards the target intersection may be adjusted such that the other traffic lights are green less time than normal to effectively detour onlooker vehicles around and not through the first intersection. In an embodiment, the green light ON distribution of the other traffic lights are modified to shorten the green-to-yellow intervals to reduce flow of traffic to the target region.

At 518, the vehicle re-routing (or second TCD avoidance) module 414 transmits re-routing information and instructions to the onlooker vehicles to autonomously drive and/or direct vehicles according to rerouting information to avoid area with TCD having the anomaly. This may include the vehicle re-routing module 414 providing suggested new paths for the onlooker vehicles to follow.

Operations 516, 518 minimizes the amount of traffic passing through the target region and reduces risk of an accident and/or a traffic jam in the target region.

Figure 10:
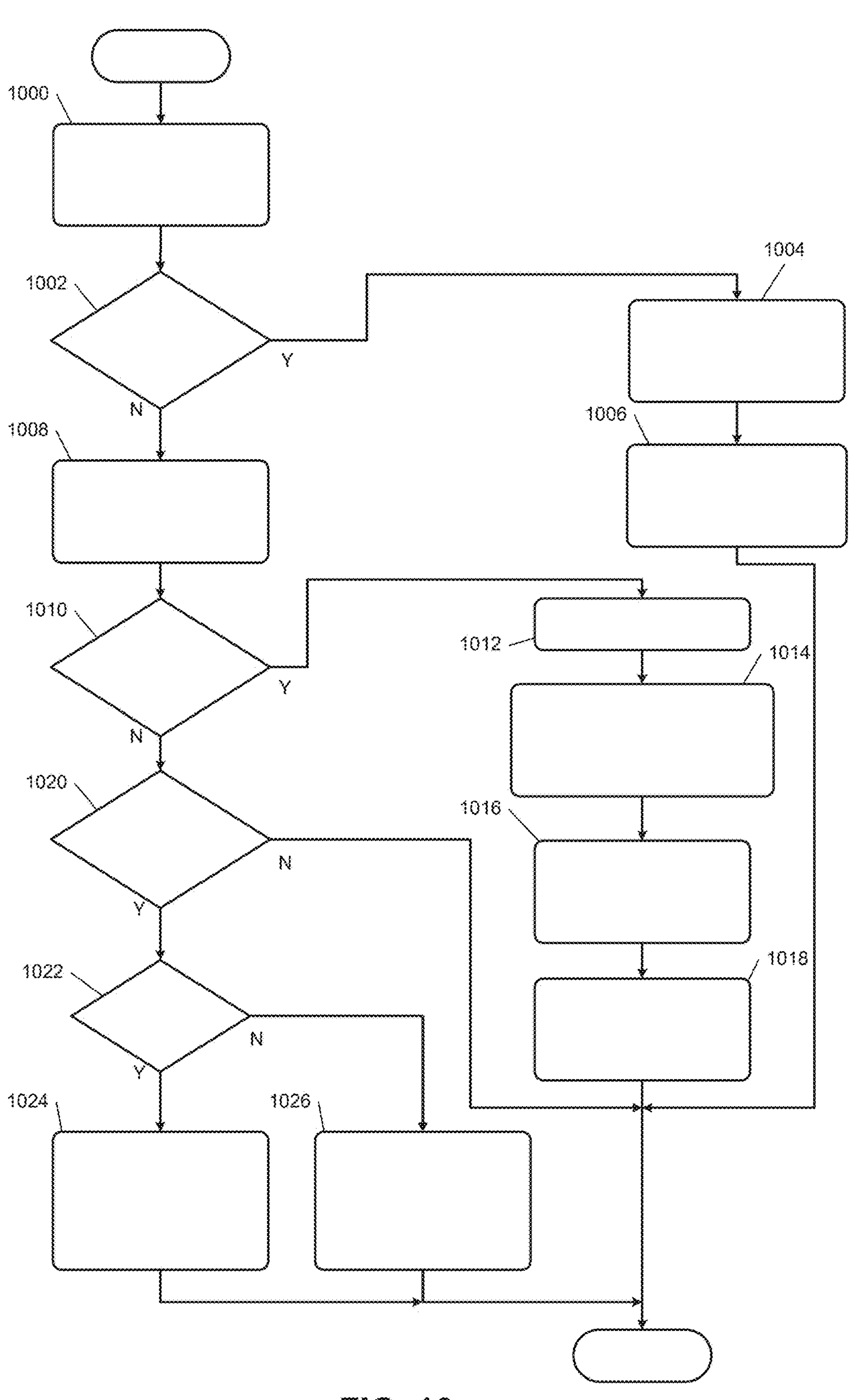
FIG. 10 illustrates an example TCD monitoring and mitigating method implemented by scouter, worker, and onlooker vehicles in accordance with the present disclosure.

FIG. 10 shows TCD monitoring and mitigating method implemented by scouter, worker, and onlooker vehicles, such as those referred to above. This method and/or a portion thereof may be implemented by each scouter, worker, and/or onlooker vehicle. The operations may be iteratively performed.

At 1000, a control module of the host vehicle receives from a cloud-based network device and/or determines a first (or scouter) probability, for example, as described above with respect to equation 1.

At 1002, the control module determines, based on the scouter probability, whether to operate as a scouter. If yes, operation 1004 is performed, otherwise operation 1008 is performed.

At 1004, the control module collects perception data including anomaly data for one or more TCDs. The control module may collect city data, vehicle data, edge computing data, TCD data, map data, camera data, other sensor data, GPS data, and/or other data associated with the TCD and report this data to the cloud-based network device at 1006. The data could include true or false indications of issues (or anomalies) with TCD. The data includes type, presence, and location of TCD. At 1006, the control module transmits the perception data and anomaly data to the cloud-based network device (e.g., the cloud-based network device 202 of FIG. 2).

At 1008, the control module receives or determines a second (or worker) probability, for example, as described above with respect to equation 2.

At 1010, the control module determines whether to operate as a worker vehicle based on the worker probability. If yes, operation 1012 is performed, otherwise operation 1020 may be performed.

At 1012, the control module receives swarm information from the cloud-based network device as described above.

At 1014, the control module autonomously drives host vehicle and/or directs a driver of the host vehicle to drive along a selected path to pass through target region having target TCD(s) with one or more anomalies. This may be based on swarm information and/or re-routing information provided by the cloud-based network device.

At 1016, the control module collects perception data including anomaly data for the target TCD(s). The control module may collect city data, vehicle data, edge computing data, TCD data, map data, camera data, other sensor data, GPS data, and/or other data associated with the TCD and report this data to the cloud-based network device at 1018. The data could include true or false indications of issues (or anomalies) with TCD. The data includes type, presence, and location of TCD. At 1018, the control module transmits perception data and anomaly data to cloud-based network device.

At 1020, the control module determines whether to operate as an onlooker vehicle. If no, the method may end, otherwise, operation 1022 may be performed.

At 1022, the control module determines whether to re-route the host vehicle. If yes, operation 1024 may be performed, otherwise operation 1026 may be performed.

At 1024, the control module autonomously drives and/or direct vehicle according to re-routing information to avoid area with TCD having anomaly as described above with respect to operation 518 of FIG. 5.

At 1026, the control module autonomously drives and/or direct vehicle based on TCD barricade operation of other TCDs as described above with respect to operation 516 of FIG. 5.

The method may end subsequent to operations 1018, 1024, 1026.

Although the above-described examples primarily describe a centralized system where data is collected and analyzed in a cloud-based network device, the operations performed herein are applicable to a decentralized system. A distributed algorithm may be implemented at each vehicle, where each vehicle makes its own decision regarding a TCD. In the decentralized system, the vehicles communicate with each other and share observations regarding a TCD. Each vehicle then makes decisions based on the host vehicle's observations and observations made by other vehicles. Conflicts in observations are handled using an algorithm to remove and/or weight less outliers and/or observations that are likely incorrect. A vehicle that is publishing incorrect information stops sharing its observations regarding the TCD. The information collected, shared and determined by the vehicles may be shared with a cloud-based network device. The cloud-based network device is more passive in the decentralized system versus the centralized system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cloud-based network device comprising:

a reporting module configured to receive first perception information regarding a target traffic control device from a scouter vehicle indicating an anomaly associated with the target traffic control device;

at least one recruitment module configured to recruit worker vehicles by signaling the worker vehicles to drive through a target region where target traffic control device is located and collect second perception information regarding the target traffic control device;

at least one consensus module configured to establish a consensus regarding the target traffic control device based on the first perception information and the second perception information; and at least one traffic control device avoidance module configured to signal at least one of i) other traffic control devices, and ii) onlooker vehicles, to prevent the onlooker vehicles from driving through the target region.

2. The cloud-based network device of claim 1, further comprising a control module of the cloud-based network device comprises a neural network configured to classify intersection traffic flow pattern of the target region as a stop-and-go pattern, a traffic-light protected pattern, or as undetermined, wherein the at least one consensus module is configured to determine the consensus based on the intersection traffic flow pattern and operational details of the target traffic control device.

3. The cloud-based network device of claim 1, wherein the at least one recruitment module is configured to direct the worker vehicles to the target region to increase reporting probability of status information regarding the target traffic control device.

4. The cloud-based network device of claim 1, wherein the at least one recruitment module is configured to swarm the worker vehicles to the target region to increase observation of the target traffic control device.

5. The cloud-based network device of claim 1, wherein the at least one consensus module is configured to continue to collect additional information regarding the target traffic control device from the worker vehicles and update the consensus based on the addition information to increase a confidence level in the consensus.

6. The cloud-based network device of claim 1, wherein the at least one consensus module is configured to determine a penalty cost for one of the worker vehicles to re-route and travel through target region and transmit the penalty cost to the one of the worker vehicles to control whether the one of the worker vehicles travels through the target region.

7. The cloud-based network device of claim 6, wherein:

the at least one consensus module is configured to determine an attractiveness value for one of the worker vehicles to re-route and travel through the target region, and transmit the attractiveness value to the one of the worker vehicles to control whether the one of the worker vehicles travels through the target region; and the attractiveness value is based on the penalty cost, a severity of event value, and an observation confidence level.

8. The cloud-based network device of claim 1, wherein:

the at least one consensus module is configured to update the consensus based on a first weighting of perception data received from the worker vehicles and a second weighting of out-of-band data;

the first weighting decreasing over time; and the second weighting increasing over time.

9. The cloud-based network device of claim 1, further comprising a target region announcement and maintenance module configured to transmit a targeted region announcement for the target traffic control device to the worker vehicles and the onlooker vehicles indicating i) there is an issue with the target traffic control device, ii) the target region affected by the issue, and iii) vehicles affected by the issue.

10. The cloud-based network device of claim 1, wherein the at least one traffic control device avoidance module is configured to virtually form a barricade around the target traffic control device by controlling the other traffic control devices to prevent the onlooker vehicles from driving through the targeted region.

11. The cloud-based network device of claim 1, wherein the at least one traffic control device avoidance module is configured to signal the onlooker vehicles to re-route around the target region.

12. The cloud-based network device of claim 1, further comprising an infrastructure integration module configured to signal a municipality device to initiate maintenance on the target traffic control device.

13. A traffic control device monitoring and anomaly mitigating system comprising:

the cloud-based network device of claim 1;

the target traffic control device; and the other traffic control devices, wherein a control module of the cloud-based network device is in communication with at least one of the target traffic control device and the other traffic control devices.

14. The traffic control device monitoring and anomaly mitigating system of claim 13, wherein the target traffic control device is a passive device or an active device.

15. A vehicle comprising:

a perception module configured to collect sensor data and out-of-band data regarding a traffic control device; and a control module configured to determine a scouter probability value of whether to operate as a scouter vehicle, determine a worker probability value of whether to operate as a worker vehicle, based on the scouter probability value and the worker probability value, determine whether to operate as a scouter vehicle or as a worker vehicle, while operating as a scouter vehicle, transmit the sensor data and the out-of-band data to a cloud-based network device indicating an anomaly associated with the traffic control device, and while operating as a worker vehicle, drive to a target region of the traffic control device and transmit the sensor data and the out-of-band data to the cloud-based network device to confirm whether an anomaly exists with the traffic control device.

16. The vehicle of claim 15, wherein the control module is configured to:

receive a signal from the cloud-based network device indicating to re-route and drive toward the target region of the traffic control device;

based on the signal, re-route to drive through the target region and while in the target region collect perception data regarding the traffic control device; and transmit the perception data regarding the traffic control device to the cloud-based network device.

17. The vehicle of claim 15, wherein the control module is configured to:

receive a signal from the cloud-based network device indicating that there is anomaly associated with the traffic control device; and determine, based on the signal, whether to drive towards the target region or avoid the target region.

18. The vehicle of claim 15, wherein the control module is configured to:

determine based on the scouter probability value and the worker probability value to operate as an onlooker vehicle;

while operating as an onlooker vehicle, receive a signal from the cloud-based networked device; and based on the signal, drive to avoid the target region.

19. The vehicle of claim 15, wherein the control module is configured to:

receive or determine a penalty cost associated with re-routing around the target region; and based on the penalty cost, drive through the target region.

20. The vehicle of claim 19, wherein the control module is configured to:

receive or determine an attractiveness value for re-routing around the target region, wherein the attractiveness value is based on the penalty cost, a severity of events value, and an observation confidence level; and based on the attractiveness value, drive through the target region.

* * * * *